Figure 3:
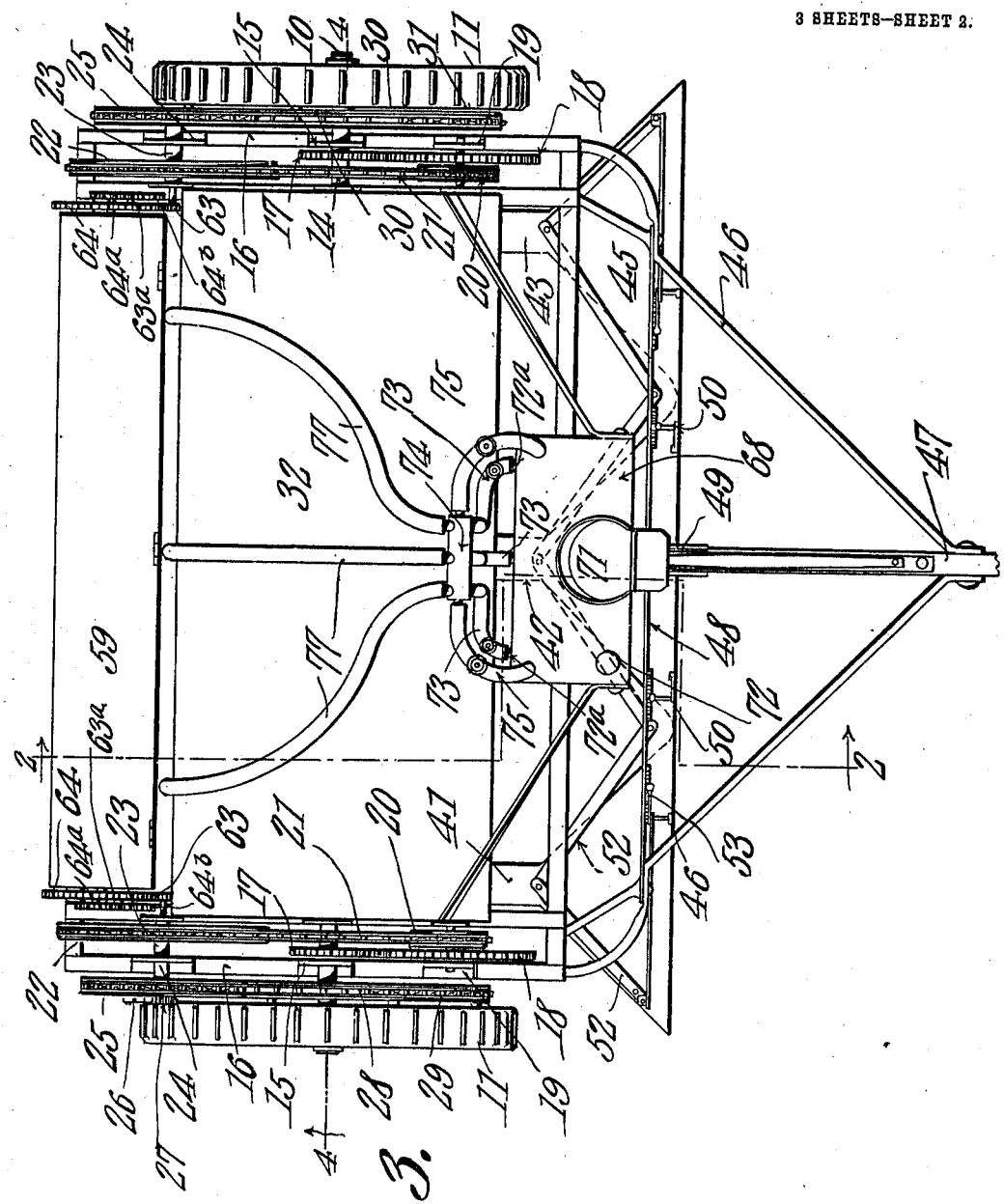

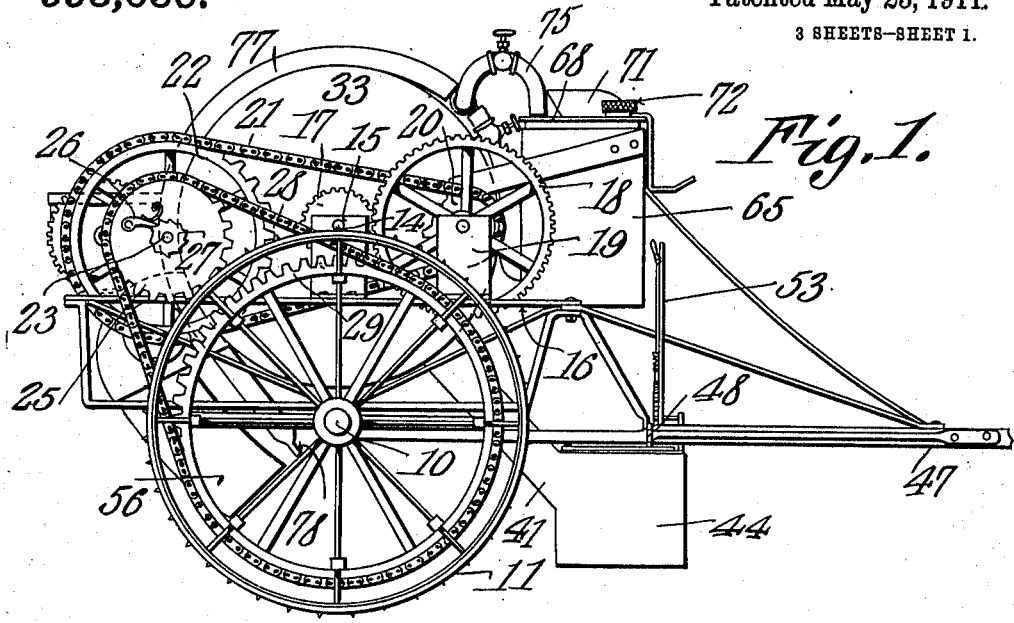
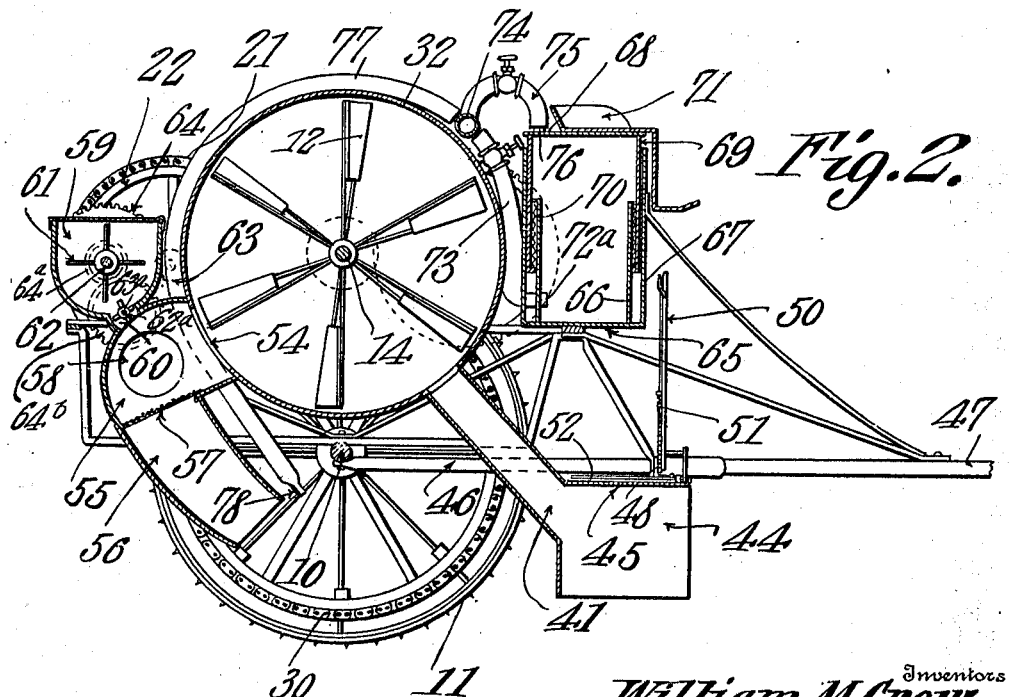

W. M. & L. H. CROW.
APPARATUS FOR DESTROYING INSECTS.
APPLICATION FILED FEB. 21, 1910.

993,036.

Patented May 23, 1911.

3 SHEETS—SHEET 2.

Witnesses

Inventors
William M. Crow and
Levi H. Crow
By C. A. Snow & Co.
Attorneys

W. M. & L. H. CROW.
APPARATUS FOR DESTROYING INSECTS.
APPLICATION FILED FEB. 21, 1910.
993,036.
Patented May 23, 1911.
3 SHEETS—SHEET 3.
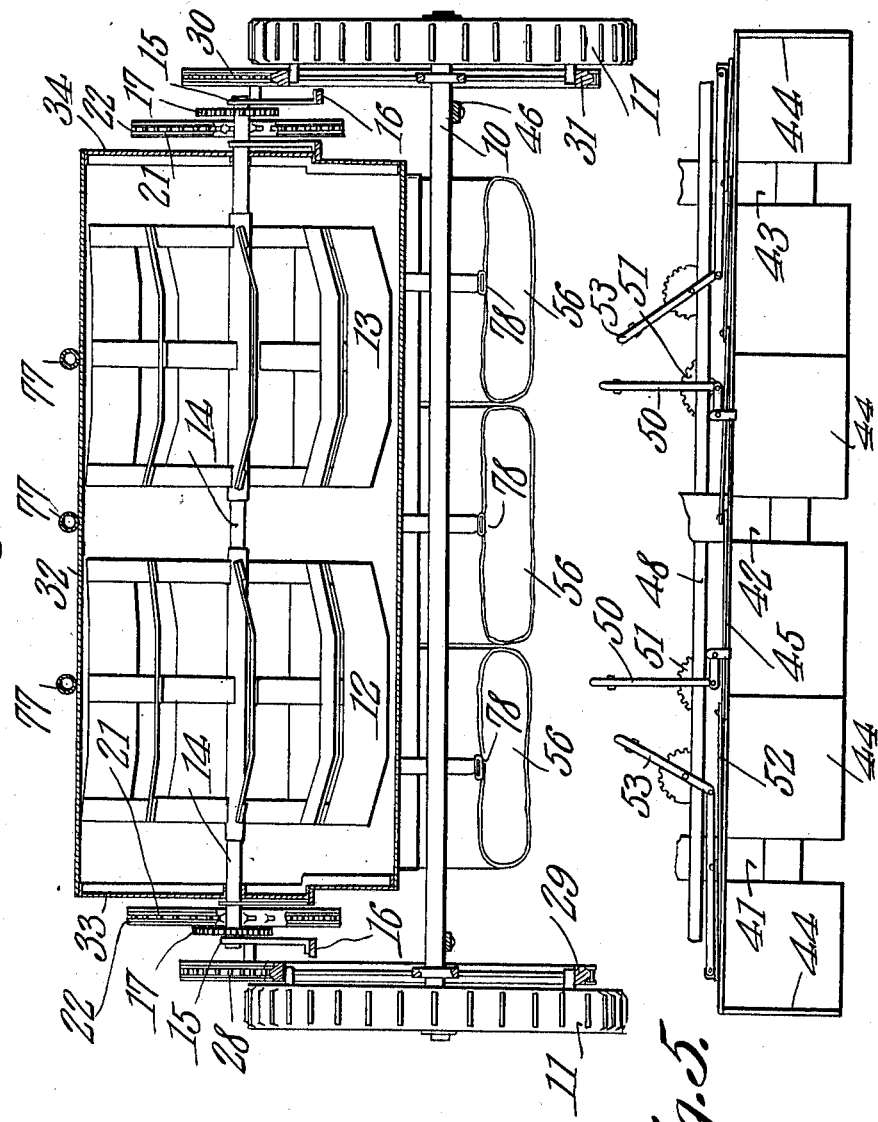

UNITED STATES PATENT OFFICE.

WILLIAM M. CROW AND LEVI H. CROW, OF WICHITA FALLS, TEXAS; SAID WILLIAM M. CROW ASSIGNOR TO SAID LEVI H. CROW.

APPARATUS FOR DESTROYING INSECTS.

993,036.     Specification of Letters Patent.     Patented May 23, 1911.

Application filed February 21, 1910. Serial No. 545,137.

*To all whom it may concern:*

Be it known that we, WILLIAM M. CROW and LEVI H. CROW, citizens of the United States, residing at Wichita Falls, in the county of Wichita and State of Texas, have invented a new and useful Apparatus for Destroying Insects, of which the following is a specification.

This invention relates to improvements in apparatus for destroying insects which infest cotton and other plants, and it has for its object to provide an apparatus of this kind which removes the insects from the plants by suction, and after removal of the insects, dusts the plant to destroy the eggs and larvæ which may be remaining thereon.

The invention also has for its object to provide an apparatus of the kind stated which moistens the plants before they are dusted so that the disinfectant will stick.

A further object of the invention is to provide an insect destroyer which will operate on several rows of plants simultaneously, and which is adjustable to different widths of rows, as well as heights of plants.

The invention also has for its object to provide an insect destroyer embodying certain novel features of construction to be hereinafter described and claimed.

In order that the invention may be fully understood, reference is had to the accompanying drawings, in which—

Figure 1 is a side elevation of the apparatus. Fig. 2 is a longitudinal section on the line 2—2 of Fig. 3. Fig. 3 is a plan view. Fig. 4 is a transverse section on the line 4—4 of Fig. 3. Fig. 5 is a front elevation of the fenders hereinafter referred to, and the means for adjusting the same.

The machine is mounted on a suitable supporting frame carried by an axle 10, fitted at its ends with ground wheels 11, said wheels being loose on the axle so that they may turn independently of each other.

At 12 and 13 are indicated the fans of the suction apparatus, they being mounted in axial alinement on a single shaft 14 extending transversely of the machine, and supported at its ends in bearing brackets 15 mounted on the side members 16 of the frame of the machine.

On each end of the shaft 14 is fixed a pinion 17 which meshes with a gear 18 fixed on a stub-shaft supported in a bearing bracket 19 mounted on the frame members 16. On the stub-shaft is also fixed a sprocket wheel 20 which is connected by a chain 21 to a sprocket wheel 22 fast on a stub-shaft 23 supported in a bearing bracket 24, mounted on the frame members 16. On the stub-shaft 23 is loosely mounted a sprocket wheel 25 which carries a spring pawl 26 engageable with a ratchet wheel 27 fast on the stub-shaft. Each side of the machine is equipped with the herein described gearing. The sprocket wheel 25 on one side of the machine is connected by a chain 28 to a sprocket wheel 29 fastened to the ground wheel 11 on the same side of the machine, and the sprocket wheel 25 on the other side of the machine is connected by a chain 30 to a sprocket wheel 31 fastened on the ground wheel on that side of the machine.

By providing the herein described pawl and ratchet drive for both ends of the fan shaft, the machine is enabled to make turns without stopping the operation of the fan, and it can also back without transmitting motion to the fan shaft.

At 32 is indicated a cylindrical casing inclosing the fans. This casing is closed at its ends, the respective end walls being indicated at 33 and 34 respectively.

With the fan casing communicate suction nozzles, three of such nozzles being provided in order that three rows of plants may be operated on simultaneously. These nozzles are indicated at 41, 42 and 43, they extending downwardly in a position so as to pass over the plants to be operated on.

At the mouths of the nozzles are mounted fenders or guides comprising side walls 44, and a top 45. Each nozzle is provided with a fender, and the plants enter between the side walls 44, and are guided thereby to the mouth of the nozzles, said walls extending divergingly from the nozzles, by which they are made to gather the plants and to direct them to the mouths of the nozzles. The fenders also serve to prevent escape of the insects.

The nozzles and fenders are preferably made of some flexible fabric so that the plants will not be injured, the fabric being mounted on a suitable skeleton frame to give the parts the form shown. The fenders are adjustable to rows of different widths as well as plants of different heights. This adjustment is effected by the following means: To the axle 10 are secured draft bars 46.

which extend forwardly therefrom, convergingly, so as to receive between their front ends a draft tongue 47. At the front end of the machine, the bars 46 are connected by a cross bar 48 to which the butt end of the tongue 47 is made fast by angle strips 49. To the cross bar 48 are fulcrumed hand levers 50 which are connected to the fenders in such a manner, that the latter are raised and lowered when the hand levers are operated. Each hand lever is provided with a suitable locking device 51. The side walls 44 of the fenders are connected at their upper ends to a frame consisting of a series of pivotally connected bars 52, one of said bars being provided for each wall, and the bars being arranged so as to give the fender walls the flared position shown.

There is sufficient slack in the fabric of which the fender walls are formed that the bars 52 may be expanded or drawn together, whereby adjustment of the fenders to the width of the rows is effected. The bars 52 are operated as stated by means of hand levers 53 fulcrumed on the cross bar 48, one of said hand levers being connected to the outer bar 52 of one of the end fenders, and the other hand lever to the outer bar 52 of the other end fender.

The outlet from the fan casing 32 is through openings 54 made in the rear side thereof, one of these openings being made in each section of the fan casing. These openings 54 communicate with a chamber 55 extending across the rear of the machine, and having in its bottom openings to which are connected chutes 56 for discharging a disinfectant on the plants as will be presently described. These chutes are also made of some suitable flexible fabric so that as they drag across the plants, the latter will not be injured. The chutes 56 communicate with the chamber 55, and across the inlet ends of the chutes are placed screens 57. The end walls of the chamber 55 are provided with doors 58 in order that access to the interior of the chamber for the purpose of removing the insects from the screens 57, may be had. Above the chamber 55, is mounted a receptacle 59 containing the disinfectant to be blown on the plants. This receptacle extends transversely of the machine, and is of substantially the same length as the chamber 55. From the bottom of the receptacle 59 a short chute 60 extends to and enters the chamber 55 through the top thereof, said chute serving to convey the disinfectant into said chamber.

The disinfectant is in the form of a powder, the same being ground up in the receptacle by means of an agitator 61 mounted therein. The agitator comprises a shaft 62 extending lengthwise through the receptacle, and armed with radially extending spikes which, when the shaft is in motion, stir up the disinfecting material and reduce the same to a powder. The agitator is operated from the stub shafts 23 by means of pinions 63 mounted on said shafts, and meshing with spur wheels 64 mounted on the ends of the shaft 62, said spur wheels being located on the outside of the receptacle. In the chute 60 is mounted an agitator $62^a$ which turns slowly and grinds out the disinfectant. This agitator is mounted on a shaft $63^a$ extending parallel to the shaft 62 and geared thereto by means of a pinion $64^a$ on the shaft 62 in mesh with a spur gear $64^b$ on the shaft $63^a$.

In the operation of the machine, it is driven along the rows of plants, and guided so that the plants enter between the fenders. As the nozzles 41 pass over the plants, the suction produced by the fans removes the insects, and they are carried through the fan casing, and thrown through openings 54 into the chamber 55. The air also enters this chamber, and is deflected into the chutes 56, and guided by the latter onto the plants. The rear wall of the chamber is curved so as to deflect the air into the chutes. The disinfecting material dropping into the chamber 55 is taken up by the air and blown on the plants, said material dropping into the chamber 55 from the receptacle 59 as already described, and passing with the air through the chutes 56. There are as many chutes 56 as there are fenders so that the same number of plants from which the insects that have been removed, will be dusted. The chutes 56 are arranged or adjusted to different heights of plants by having different sizes or lengths of such chutes.

In order that the disinfecting material may stick to the plants, means are provided for sprinkling the plants before applying the disinfectant. This operation is effected by the following means: On the top of the machine is mounted a tank 65 having double walls indicated at 66 and 67 respectively. This tank is fitted with a lid 68 having a continuous depending flange 69 which extends down into the space between the walls 66 and 67. To the upper edge of the wall 66 is secured a sheet 70 of rubber or other flexible material, said sheet lying between the wall 66 and the flange 69, it being also secured to the lower edge of the flange. The function of the sheet 70 is to make an air and liquid tight joint between the wall 66 and the flange 69. On the lid 68 is mounted the driver's seat 71, and the lid is also provided with a suitable filling opening having a closure 72. The tank 65 is fitted with a nipple $72^a$ to which are connected flexible tubes 73 leading to a union 74. To this union are also connected flexible tubes 75 extending to and fitted on nipples 76 on the lid 68. To the union 74 are also connected discharge pipes 77 which may also be flexible tubes, and said pipes are provided with nozzles 78. Three of these pipes are provided in order that three rows of plants may be simultaneously sprinkled, and they extend over the fan casing 32, and downwardly behind the same into proper position to direct the fluid on the plants, the discharge nozzles 78 being located slightly in advance of the discharge ends of the chutes 56. Three tubes 73 extend from the tank to the union, and two tubes 75 extend from the lid to the union, the last mentioned tubes entering opposite ends of the union.

In operation, the tank 65 is partly filled with water so as to leave an air space between the surface of the water and the lid 68. The air contained in this space is compressed by the weight of the driver occupying the seat 71, whereby the water is forced out of the tank, and is discharged through the nozzles 78 onto the plants. If desired, Paris green or other poisons may be added to the water, so that the destruction of any insects that may remain on the plants is assured. The tubes 73 and 75 are provided with valves which will be closed at first, and after the air is compressed in the tank, the valves will be opened more or less to start the springing operation, the proportion of water and air being mixed by adjustment of the valves.

It is believed that the operation of the apparatus will be apparent from the foregoing description, but it may be summarized as follows: After filling the receptacle 59 and the tank 65, and adjusting the fenders to the height of the plants, as well as the width of the rows, the machine is driven across the field and guided so that the plants will properly enter between the fenders. The suction produced by the fans removes the insects from the plants, and the disinfecting material ground out of the receptacle 59 is blown on the plants after the insect has been sucked off the same. Previous to applying the disinfecting material, the plants are dampened or moistened so that the disinfectant will stick. The apparatus is simple in construction, and it is easy to operate, only one attendant being necessary, whose only duty is to guide the machine, the remainder of the operation being entirely automatic.

What is claimed is:

1. In an insect destroyer, a wheeled frame, a suction apparatus mounted thereon and including a suction nozzle, a disinfectant distributer operating behind the suction nozzle, and a liquid spraying device having a nozzle located adjacent to the disinfectant distributer and discharging in front thereof.

2. In an insect destroyer, a wheeled frame, a fan and its casing mounted on said frame, a suction tube extending from the fan casing, a chamber into which the fan discharges the insects, a receptacle for a disinfecting material discharging into the chamber, and a chute extending from said chamber through which the disinfecting material is blown onto the plants.

3. In an insect destroyer, a wheeled frame, a fan and its casing mounted on said frame, a suction pipe connected to the fan casing, a chamber into which the fan discharges the insects, a receptacle containing a disinfectant, said receptacle discharging into the aforesaid chamber, an agitator working in the receptacle, and a chute extending from the chamber, through which chute the disinfecting material is blown onto the plants.

4. In an insect destroyer, a wheeled frame, a fan and its casing mounted in the frame, a suction tube, and an outlet chute connected to the fan casing, an insect receptacle connected to said outlet chute, and a receptacle for a disinfecting material discharging through the outlet chute.

In testimony that we claim the foregoing as our own, we have hereto affixed our signatures in the presence of witnesses.

WILLIAM M. CROW.
LEVI H. CROW.

Witnesses as to William M. Crow:
J. J. SWEENEY,
OTIS L. DUNCAN.

Witnesses as to Levi H. Crow:
J. L. POWELL,
THOS. J. LANCASTER.

---

Copies of this patent may be obtained for five cents each, by addressing the "Commissioner of Patents, Washington, D. C."